UNITED STATES PATENT OFFICE.

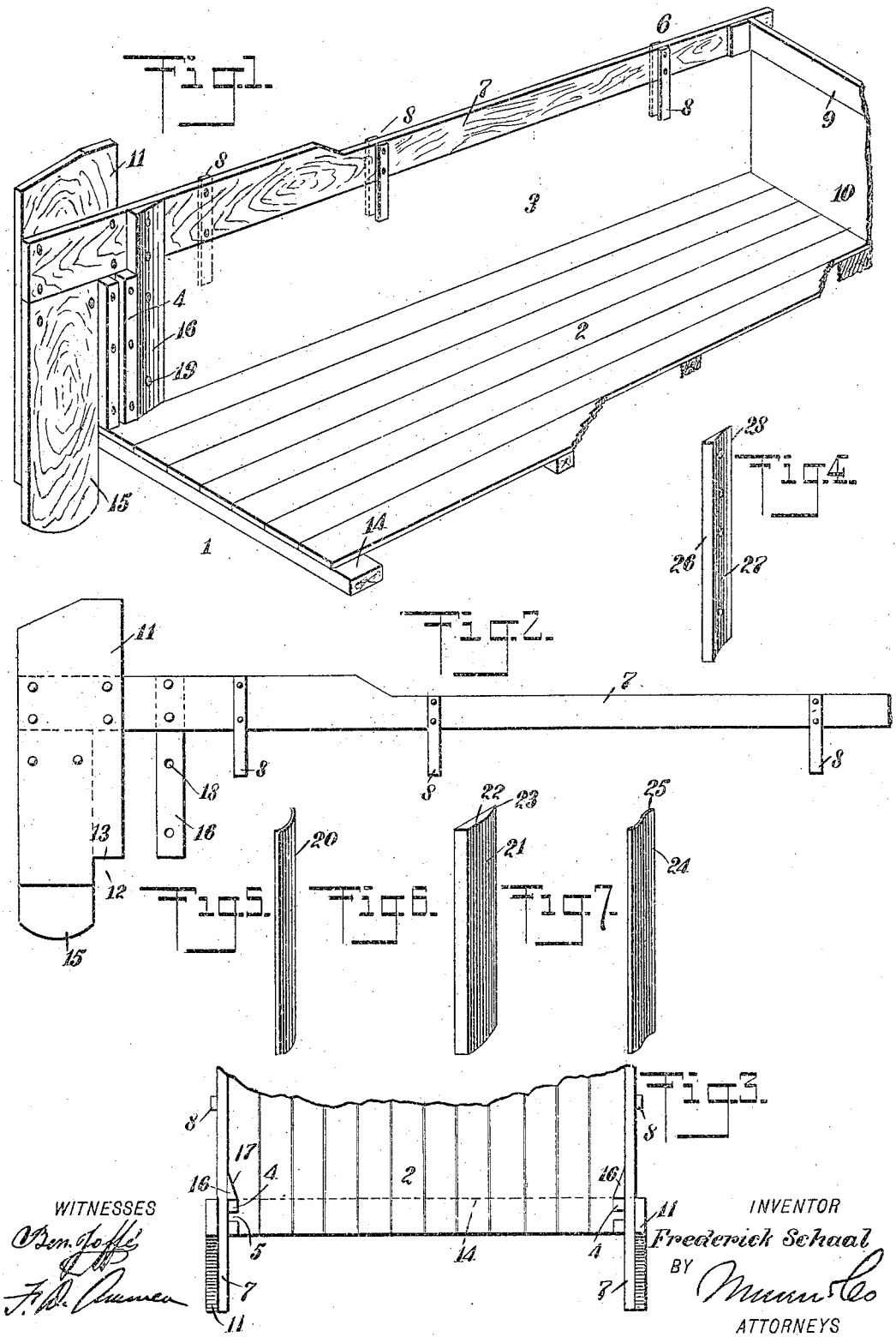

FREDERICK SCHAAL, OF NEAR STAPLEHURST, NEBRASKA.

FRAME FOR MANURE-SPREADERS.

949,601.

Specification of Letters Patent.  Patented Feb. 15, 1910.

Application filed July 2, 1909. Serial No. 505,611.

*To all whom it may concern:*

Be it known that I, FREDERICK SCHAAL, a citizen of the United States, residing near Staplehurst, in the county of Seward and State of Nebraska, have invented a new and Improved Frame for Manure-Spreaders, of which the following is a full, clear, and exact description.

This invention relates to a frame which is adapted to be attached to a wagon or cart body so as to adapt the same to be used as a manure spreader.

The object of the invention is to produce a frame of simple construction which can be readily attached to the box or body of the cart or wagon, and which will be constructed in such a way as to facilitate the removal of the manure from the rear end.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a perspective showing a portion of a wagon body and a portion of the frame as applied thereto; Fig. 2 is a side elevation of the frame, representing the same as removed from the box of the cart; Fig. 3 is a plan of the rear end of the box or cart body and showing the rear ends of the spreader frame; Fig. 4 is a perspective showing a modified form of filler piece which constitutes a feature of the invention; Fig. 5 is also a perspective showing another modified form of the filler piece; Fig. 6 is also a perspective showing another modified form of filler piece; and Fig. 7 is also a perspective showing another modified form of filler piece.

Referring more particularly to the parts, 1 represents the box or body of a cart or wagon having a bottom 2, with sides 3. At the rear ends of the sides 3, gate cleats 4 are provided to form a guideway 5 therebetween to receive the ends of the removable gate of the box or body.

My frame 6 comprises side rails 7 which are adapted to rest upon the upper edges of the sides 3 of the box. These rails are provided at suitable points with downwardly projecting fingers 8 which are rigidly attached to the rail, as shown. The lower ends of these fingers project down on the faces of the sides so as to hold the rails in an upright position, as will be readily understood. The forward ends of the rails 7 are connected by a forward rail 9 which rests upon the upper edge of the dashboard 10 of the box. The rear ends of the rails 7 are of increased depth, as shown, and these ends project beyond the rear end of the box, as indicated. On the outer sides of these projecting ends, heads 11 are attached, said heads being formed of a board or a plate. These heads 11 are provided at their lower edges with notches 12, respectively, which form horizontal shoulders 13. These shoulders 13 are adapted to engage with the ends of the rear bolster 14 which projects laterally at the rear end of the box. On the inner sides of the heads 11, brace plates or brace boards 15 are attached, and the forward edges of these boards abut against the rear edges of the sides 3.

Just forward of the cleats 4, I provide fillers 16. Each of these fillers is in the form of a strip or cleat, the upper end of which is attached to the inner face of the corresponding side rail 7. These cleats extend down on the inner faces of the sides 3, and their rear edges abut against the forward side of the inner guide cleat. On the outer or extension sides, the fillers 16 present inclined faces 17. In other words, in their plan view as indicated in Fig. 3, the fillers are wedge-shaped. The lower portions of the fillers 16 are provided with bolt openings 18 which afford means for attaching removable bolts 19, which bolts pass through the sides 3 and afford means for securing the frame rigidly to the box.

Instead of forming the fillers 16 as indicated, I may form them of curved plates 20, as indicated in Fig. 5. These plates are attached with their concaved faces disposed inwardly and so that the rear edge of the plate lies near the outer face of the guide cleat.

In Fig. 6 I show another modified form in which the filler 21 presents a flat face 22 at its rear inner side which is substantially parallel with the faces of the sides 3, and only the forward portion of the filler is tapered so as to form an edge 23 which lies along the inner face of the side.

In Fig. 7 I show another modified form in which the cleat is formed of a double curved plate, the rear portion 24 of the plate being curved oppositely to the forward portion 25. The portion 25 is adapted to be attached to the face of the side 3 so that the rear edge of the filler will lie near the inner face of the forward guide cleat. In this form of the filler the forward part of the filler presents a concaved curve and the rear part a convexed face toward the interior of the box.

In Fig. 4 I show another modified form in which the filler 26 is provided with a concaved outer face 27, presenting a sharp edge 28 which lies against the face of the side 3, as in the preferred form.

In all of the fillers the construction is such as to prevent the guide cleats 4 from obstructing the passing of the manure out of the rear end of the box. In this connection it should be understood that at the rear end of the frame a reel or distributer will be mounted. Attention is called to the fact that a frame constructed as described can be readily attached and detached from the cart body or box. It will be seen that the fillers effectively mask or hide the shoulders formed by the forward sides of the forward cleats, preventing the obstruction which might otherwise occur at this point.

Having thus described my invention, I claim as new and desire to secure by Letters Patent,—

1. A box or body for a vehicle having sides with guide cleats at the rear end thereof for a gate, and a removable spreader frame having members attached thereto and disposed forward of said cleats, said members presenting inclined faces to mask the shoulder formed at the forward sides of said cleats.

2. A box for a vehicle having sides with guide cleats at the rear ends thereof, and a spreader frame having rails seating on the upper edges of said sides and having fillers attached to said rails and extending downwardly on the inner faces of said sides, said fillers being disposed adjacent the forward sides of said guide cleats, said fillers presenting inclined faces forming guides at said cleats.

3. A box for a vehicle having sides with cleats at the rear ends thereof, a spreader frame having side rails seating on said sides, and means for supporting said side rails in a substantially erect position, said side rails having heads attached to the rear ends thereof and extending beyond said sides at the rear edges thereof.

4. A box for a vehicle having sides with guide cleats at the rear ends thereof, a spreader frame having side rails seating on the upper edges of said sides and having extensions projecting beyond the rear ends of said sides, heads attached to said extensions and extending beyond the rear ends of said sides, and fillers attached to said side rails and extending downwardly on the inner face of said sides and adjacent the forward sides of said cleats, said fillers presenting inclined guide faces.

In testimony whereof I have signed my name to this specification in the presence of two subscribing witnesses.

FREDERICK SCHAAL.

Witnesses:
JOHN L. JORGENSEN,
HENRY FORSTER.